United States Patent [19]

Veronesi et al.

[11] Patent Number: 5,185,545
[45] Date of Patent: Feb. 9, 1993

[54] DUAL PROPELLER SHOCK RESISTANT SUBMERSIBLE PROPULSOR UNIT

[75] Inventors: Luciano Veronesi, O'Hara Township, Allegheny County; Raymond M. Calfo, Murrysville; James A. Drake, O'Hara Township, Allegheny County, all of Pa.

[73] Assignee: Westinghouse Electric Corp., Pittsburgh, Pa.

[21] Appl. No.: 571,942

[22] Filed: Aug. 23, 1990

[51] Int. Cl.[5] .......................................... H02K 16/00
[52] U.S. Cl. ..................................... 310/114; 310/89; 310/90; 440/6; 440/38; 440/80; 440/81
[58] Field of Search ............... 310/89, 90, 114; 440/6, 440/38, 80, 81

[56] References Cited

U.S. PATENT DOCUMENTS

| | | |
|---|---|---|
| 1,996,195 | 5/1933 | Ferguson. |
| 3,708,251 | 1/1973 | Pierro .................................. 310/263 |
| 4,360,751 | 11/1982 | Arnold, Jr. et al. |
| 4,389,197 | 6/1983 | Ballantine ............................. 440/60 |
| 4,459,087 | 1/1984 | Barge. |
| 4,831,297 | 5/1989 | Taylor et al. ......................... 310/87 |
| 4,876,492 | 10/1989 | Lester et al. |

FOREIGN PATENT DOCUMENTS

| | | | |
|---|---|---|---|
| 62-6891 | 1/1987 | Japan .................................. 310/114 |
| 1439806 | 6/1976 | United Kingdom. |

OTHER PUBLICATIONS

Brochure of Jastram-Werke GmbH KG entitled "Jastram Forschung-From the Idea to the Marketable Product" dated Aug. 1988.

*Primary Examiner*—David Cain

[57] ABSTRACT

A high-thrust, shock-resistant submersible propulsor unit comprises of a shroud having a water inlet and a water outlet, a shaft assembly centrally mounted within the shroud, and an upstream and a downstream propeller, each of which includes a separate hub rotatably mounted on the shaft assembly, first and second electric motors for independently rotating the upstream and the downstream propellers, wherein each motor includes a rotor mounted around the outer periphery of one of the propellers, and a stator mounted on the shroud around the rotor, and first and second bearing assemblies, each of which includes a thrust bearing disposed within the hubs of the upstream and downstream propellers in the shaft assembly, wherein the thrust bearings associated with the first and second bearing assemblies are located on opposite ends of the shaft assembly. Each of the bearing assemblies includes a removable cover which affords easy and separate access to the bearing contained in each. The pitch of the upstream and downstream propellers is different so that they may be counter-rotated to produce torque free thrust. In the preferred mode of operation, the propellers are rotated at different speeds such that the upstream propeller supercharges the downstream propeller.

27 Claims, 6 Drawing Sheets

DUAL PROPELLER SHOCK RESISTANT SUBMERSIBLE PROPULSOR UNIT

BACKGROUND OF THE INVENTION

This invention relates to submersible propulsor units, and is specifically concerned with a high thrust, primary integral-motor type propulsor unit for water vehicles that provides low noise emissions, high shock resistance, and easy maintenance.

The primary propulsor systems used to drive large surface ships and submarines have, in the past, generally comprised a fossil fuel or nuclear powered prime mover that powers a propeller located on a shaft that extends through the hull of the vehicle through a water-tight seal. A gear train is typically provided between the output shaft of the prime mover and the shaft connected to the propeller.

Unfortunately, there are three major shortcomings associated with such primary propulsor systems that limit their usefulness in military applications. First, the shaft seals necessary to keep water out of the hull of the ship are relatively delicate structures which are highly vulnerable to damage when subjected to the kind of mechanical shocks that may be expected under combat conditions. Second, the use of a gear train generates a relatively high level of noise that may render the vehicle easily detectable by the sonar equipment of hostile nations. Thirdly, the prime mover, gear train, and propeller shaft must all be located in alignment with one another at the rear of the vehicle for the efficient transfer of power, which in turn limits the design options for the vessel designer.

Electric motor type propulsor units for water vehicles are also known in the prior art. While such propulsors may be used for surface vessels, they find their primary application as secondary drive units for submarines where reliability, control, high thrust coupled with low noise emissions, and shock resistance are at a premium. In the prior art, such propulsor units have typically comprised a "canned" electric motor having an output shaft that is connected to a propeller. Such propulsor units advantageously eliminate the vulnerable seals and noisy gear trains associated with conventional primary propulsor systems. They also afford the designer of the vehicle some liberality with respect to the design of the vehicle, as such propulsor units may be located at any one of a number of locations along the hull of the vessel, and not necessarily at the rear of the vessel. Unfortunately, such electrically-powered propulsor units also have certain drawbacks. For example, because the "canned" motor must be disposed either directly in front of or behind the flow of water generated by the propeller, the location of the motor creates obstructions to fluid flow that tends to reduce the effective thrust that can be generated by these units while at the same time creating unwanted noise. Of course, the thrust may be increased by increasing the rotational speed of the motor. However, this may create cavitation in the water surrounding the propeller which creates even more noise.

To overcome these shortcomings, the Westinghouse Electric Corporation developed an integral motor propulsor unit that is disclosed and claimed in U.S. Pat. No. 4,831,297. This particular propulsor unit generally resembles a jet engine in structure and comprises a cylindrical shroud having a water inlet and a water outlet, a propeller having a hub rotatably mounted within a shroud on a shaft that is concentrically mounted within the shroud by a plurality of support vanes, and an electric motor for driving the propeller that includes an annular rotor mounted around the periphery of propeller blades, and a stator that is integrated within the shroud of the unit. The advanced design of this particular prior art propulsor unit substantially increases the thrust output for a propulsor for a given weight and size while simultaneously reducing the noise generated by the unit due to the largely unencumbered flow of water that the propeller of the device can force through the fluid-dynamically shaped shroud, and the relatively large-diameter propeller that this design is compatible with. The quietness of the unit is further improved due to the noise-blocking characteristics of the shroud.

While the aforementioned integral motor propulsor unit represents a substantial advance in the art, the applicants have noted a number of limitations associated with the design of this device which might impair its ability to fulfill certain applications. For example, while the thrust output per unit weight ratio is associated with this particular prior art propulsor is very high, the absolute amount of thrust that can be generated by this propulsor might not be high enough for certain applications. Of course, this prior art propulsor unit could be upscaled in all dimensions to produce more power. However, for certain submarine and military surface ship applications, there are limitations with respect to the width of the propulsor unit which might not allow such an overall upscaling of the device to solve the problem of the need for increased thrust. As the width of the propulsor unit increases, the unit as a whole exposes more and more area to fore and aft shock waves that military submarines and surface ships might be exposed to during combat. Still another limitation associated with such prior art propulsion units is caused by the arrangement of the thrust bearings used in these units. These bearings must be routinely serviced, and the difficult access caused by the manner in which these bearings are arranged necessitates either the complete removal of the propulsor unit from the vessel whenever the bearing assemblies must be repaired or replaced, or the dry docking of the vessel itself which, of course, requires considerable effort and expense. After such removal or dry docking has taken place, a large amount of disassembly of the unit is required to access the bearings.

Clearly, there is a need for a submarine propulsor unit that maintains all of the advantages associated with the latest prior art propulsor units, but which is capable of generating larger amounts of thrust with a mechanism which does not exceed the maximum width limitations associated with submarine applications. It would further be desirable if the bearing assemblies could be easily accessed in the event that a repair or maintenance operation were necessary without the need for removing the unit from the vessel or dry docking the vessel, and without the need for a large amount of disassembly of the unit. Ideally, such a propulsor unit would be even more durable and reliable than prior art units, and would possess even greater shock resistance.

SUMMARY OF THE INVENTION

Generally speaking, the invention is a dualpropeller, submersible propulsor unit that obviates or at least ameliorates the aforementioned shortcomings associated with the prior art. The propulsor unit generally comprises a shroud having a water inlet and a water outlet, a shaft assembly centrally mounted within the shroud, first and second propellers, each of which includes a separate hub rotatably mounted on the shaft assembly, the second propeller being located downstream of the first propeller, and first and second electric motors for separately rotating the propellers, each of which includes a rotor mounted around the outer periphery of one of the propellers, and a stator mounted on the shroud around the rotor, and first and second bearing assemblies, each of which includes a thrust bearing disposed between the hubs of the first and second propellers and the shaft assembly, wherein the thrust bearings associated with the first and second bearing assemblies are both located on opposite ends of the shaft assembly.

The provision of two separately driven propellers substantially increases the thrust generated by the unit, as well as its efficiency, without increasing the width of the shroud. The provision of separate bearing assemblies for each of the two propeller hubs allows the bearings associated with each to be disassembled and serviced independently without the need for disassembling or otherwise dismantling the other. The mechanical independence of the two propellers and the electrical independence of the two motors that drive them advantageously increases the reliability of the unit by conferring a true, redundant drive capacity to it.

Two pairs of vane members support the shaft assembly within the shroud, and each of the bearing assemblies includes a bearing housing having a member that is affixed to the inner ends of the shaft assembly so that the shaft assembly is securely and rigidly mounted within the shroud assembly at two points. Such two-point mounting greatly enhances the shock resistance of the propulsor unit.

To further reduce the noise generated by the propulsor unit during its operation, the bearing housings associated with each of the bearing assemblies located on either end of the shaft assembly are preferably mounted so that they remain stationary relative to the propellers. Each of the bearing housings further includes a removable cover for affording the afore-mentioned convenient access to the bearing members contained therein. Finally, the profiles of each of these bearing houses is selected so that it minimizes the amount of turbulence generated by the flow of pressurized water through the shroud, which in turn helps to reduce even further the noise generated by the unit.

The pitch of the downstream propeller is preferably opposite of the upstream propeller so that the propellers may be counter-rotated during operation to generate the requisite thrust. Such counterrotation provides the further advantage of eliminating virtually all of the torque that the propulsor unit would apply to the vehicle that it is driving.

In the preferred method of operation, the upstream and downstream propellers are rotated at different speeds such that the upstream propeller acts to supercharge the downstream propeller with a pressurized flow of water, thus maximizing the thrust-producing efficiency of the unit.

BRIEF DESCRIPTION OF THE SEVERAL FIGURES

DETAILED DESCRIPTION OF THE PREFERRED EMBODIMENTS

Figure 1:
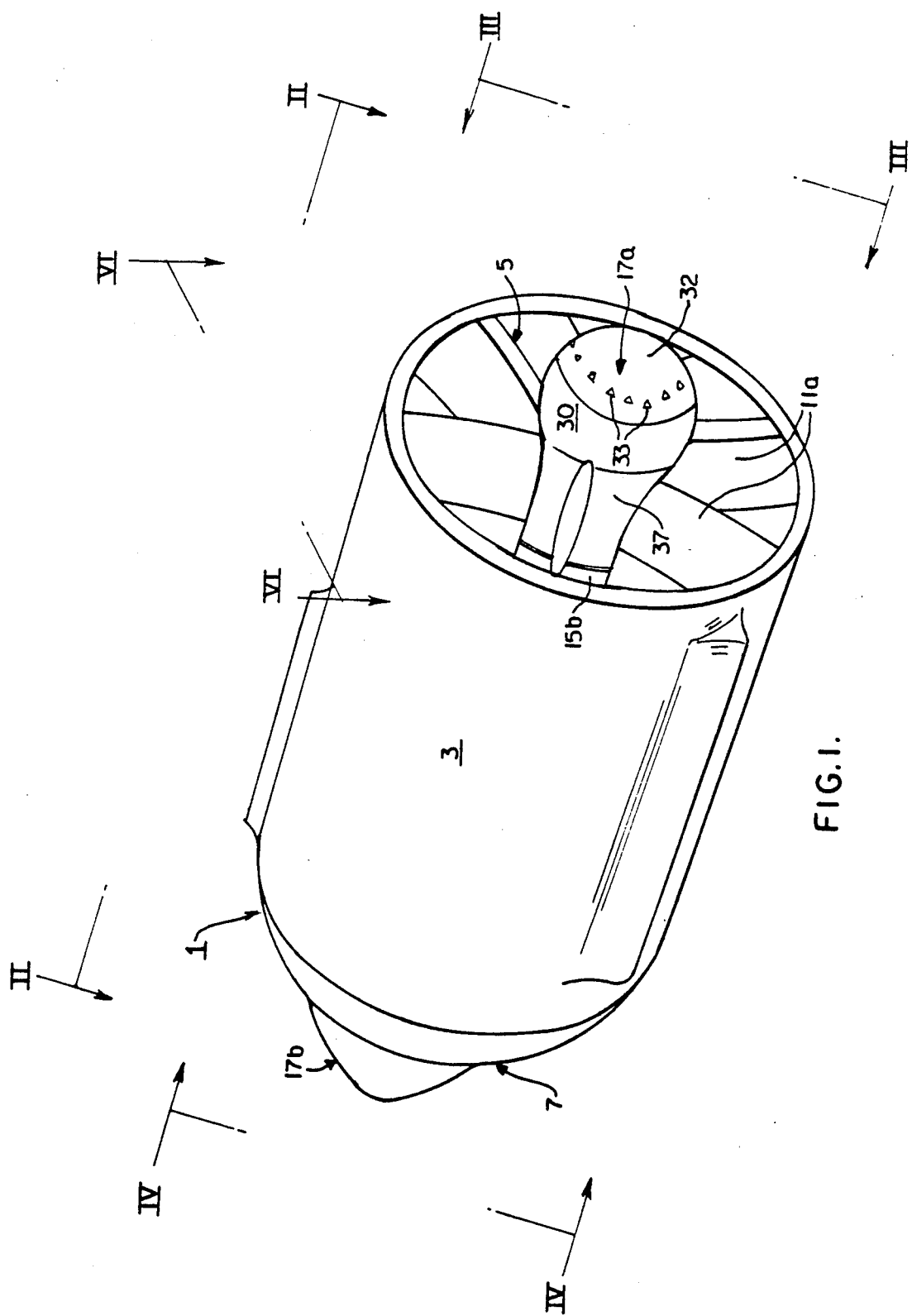
FIG. 1 is a perspective view of the dual-propeller propulsor unit of the invention.

With reference now to FIGS. 1, 2, 3 and 4, wherein like reference numerals designate like components throughout all the several figures, the propulsor unit of the invention generally comprises a shroud assembly 3 having an inlet 5, and an outlet 7 whose interior is generally shape like a fluted Kort nozzle. A stationary shaft assembly 9 having a centrally-disposed through-bore 10 is mounted along the axis of rotation of the interior of the shroud assembly 3 by two sets of vane members 11a,b. In addition to supporting the shaft assembly 9 within the shroud assembly 3, the vane members 11a,b, by virtue of their canted orientation (best seen in FIGS. 3 and 4) further function to enhance the thrust generated by the propellers 13a,b. The propellers 13a,b are disposed in-tandem with respect to one another within the interior of the shroud assembly 3 as shown. Each of these propellers 13a,b include hubs 15a,b having offset portions 16 which are rotatably mounted over the stationary shaft assembly 9 by means of bearing assemblies 17a,b, respectively. Each of these propellers 13a,b further includes a plurality of pitched blades 19 whose inner ends are equidistantly mounted around its respective hub 15a,b. In the preferred embodiment, the blades 19 of each of the propellers 13a,b are pitched oppositely with respect to each other so that relatively torque-free thrust may be generated when the two propellers 13a,b are counterrotated. The outer ends of each of the propellers 13a,b are connected to a rotor 23a,b of an electric motor 24a,b that is integrally formed within the shroud assembly 3. The electric motors are each independently operable, and further include a stator 25a,b mounted within the shroud assembly 3 and disposed around the rotors 23a,b in a closely-spaced relationship. Although not shown in any of the several figures, a terminal post assembly is provided at the top of the propulsor unit 1 for connecting the stators 25a,b of each of the electric motors 24a,b to a separate power source which, in the preferred embodiment, is a variable frequency cycloconverter.

With reference now FIGS. 2 and 5A, each of the bearing assemblies 17a,b includes a bearing housing 30 which, as will be described presently, contains both a thrust bearing and a radial bearing for minimizing friction between the propeller hubs 15a,b and the shaft assembly 9. Each of these bearing housings includes a removable cover 32 for affording easy access to the bearings contained within the housing 30. The removable cover 32 of each of the bearing assemblies 17a,b is provided with a plurality of water conducting ports 33 which, as will be described in greater detail, allows ambient water to circulate through the bore 10 contained within the shaft assembly 9 in order to cool and to lubricate the bearing surfaces associated with each of the bearing assemblies. To prevent particles of foreign debris entrained within this ambient water from entering the through-bore 10 of the shaft assembly 9, the housing 30 of each of the bearing assemblies 17a,b is provided with a sea water filter 35 in the position illustrated in FIG. 2. The inwardly facing portion of each of the housings 30 associated with the bearing assemblies 17a,b includes a vane mounting member 37, onto which the inner ends of the vane 11a,b are secured. The provision of two separate sets of vanes 11a,b, in combination with the provision of two separate vane mounting members 37 in the housings 30 of the two opposing bearing assemblies 17a,b provide a great deal of advantageous shock resistance to the shaft assembly 9 disposed within the shroud assembly 3. Such enhanced shock resistance helps to prevent shockinduced misalignments between the shaft assembly 9 and the interior of the shroud assembly 3 which could otherwise render unit 1 inoperative.

The specific structural details of both the thrust and radial bearings contained within the housing 30 of each of the bearing assemblies 17a,b will now be discussed. As the details of these structures are identical for both of the bearing assemblies 17a,b, reference will only be made to the structural details of bearing assembly 17a in order to avoid prolixity. The primary thrust bearing 38 within bearing assembly 17a is built around an annular support member 39. Member 39 is rigidly affixed to the outlet end of the shaft by means of bolts 40. In its interior, the annular support member 39 includes a water inlet nipple 41 which is received within the throughbore 10 of the shaft assembly 9. This nipple 41 rigidifies the mechanical connection between the annular support member 39 and the shaft assembly 9, while allowing ambient water to circulate through the through-bore 10. Around its outer edge, the annular support member 39 includes a mounting flange 43. A support ring 45 is mounted within an annular recess provided within the inner face of the annular support member 39. This support ring 45 in turn supports a primary thrust bearing ring 47 which remains stationary with respect to the propeller hub 15a during the operation of the unit 1. A primary runner 49 is connected to the end of the offset portion 16 of the propeller hub 15a. In the preferred embodiment, radial grooves are provided in the primary bearing ring 47 to form individual bearing pads (not shown) which are pivoted at a selected angle with respect to the planar face of the ring 47. When ambient water is circulated between the bearing surfaces of the primary bearing ring 47 and the primary runner 49, a hydro-dynamic film of water provides lubrication between the ring 47 and runner 49, and further provides cooling for this particular portion of the bearing assembly 17a. To provide the necessary flow of lubricating and flowing water, the primary runner 49 has a plurality of radially-oriented impeller bores 51 which, when the runner 49 is rotated by the hub 15a, allows the runner 49 to act as an impeller. The precise manner in which the pressure differential generated by the impeller bores 51 acts to circulate ambient water through the bearing surfaces of the assembly 17a will be discussed later.

Each of the bearing assemblies 17a,b further includes a secondary thrust bearing 52. The runner 53 for the secondary thrust bearing 52 is disposed on the face of the runner 49 of the primary thrust bearing 38 that is opposite from the primary bearing ring 47. Hence runner 49 acts as a runner for both the primary thrust bearing 38, and a secondary thrust bearing 52. A secondary bearing ring 55 forms the other half of the secondary thrust bearing 52. This bearing ring 55 is supported by a support ring 56 which is affixed to the vane mounting member 37 of the bearing housing 30. It should be noted that the secondary thrust bearing 52 is called into operation only when the motor 24a is run in reverse, or when the motor 24a is off and the propeller 13a is "windmilling" as a result of ambient water currents.

Figure 2:
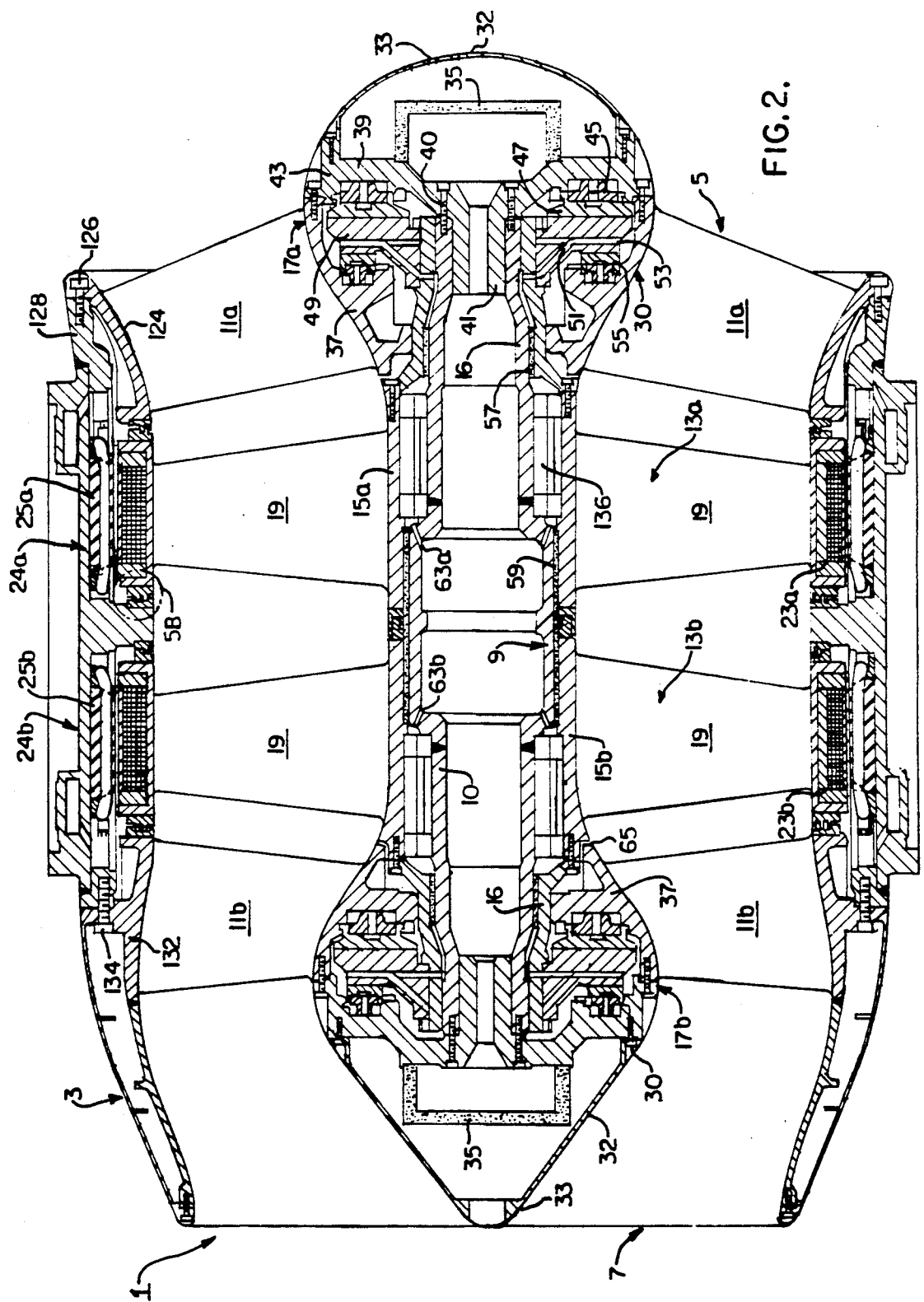
FIG. 2 is a cross-sectional side view of the propulsor unit illustrated in FIG. 1 along the line 2—2.
Figure 4:
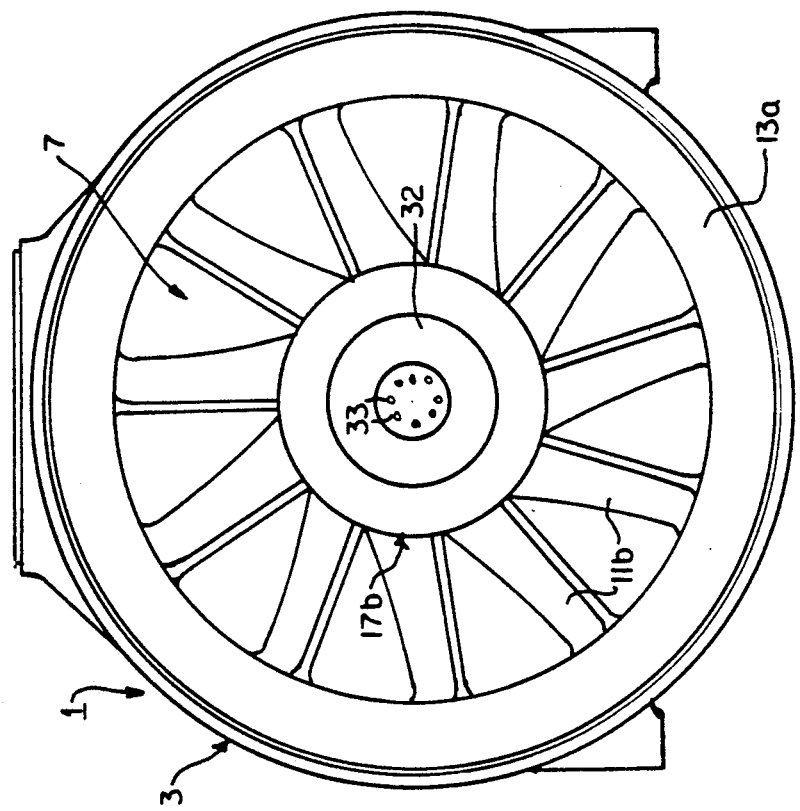
FIGS. 3 and 4 are front and rear views of the propulsor unit illustrated in FIG. 1, respectively.
Figure 3:
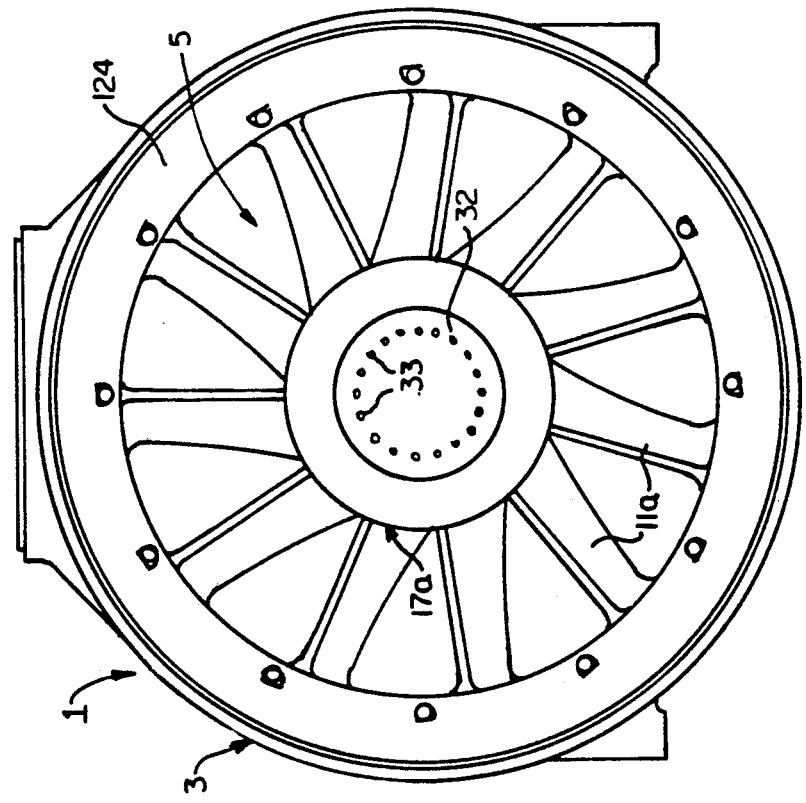
Figure 5A:
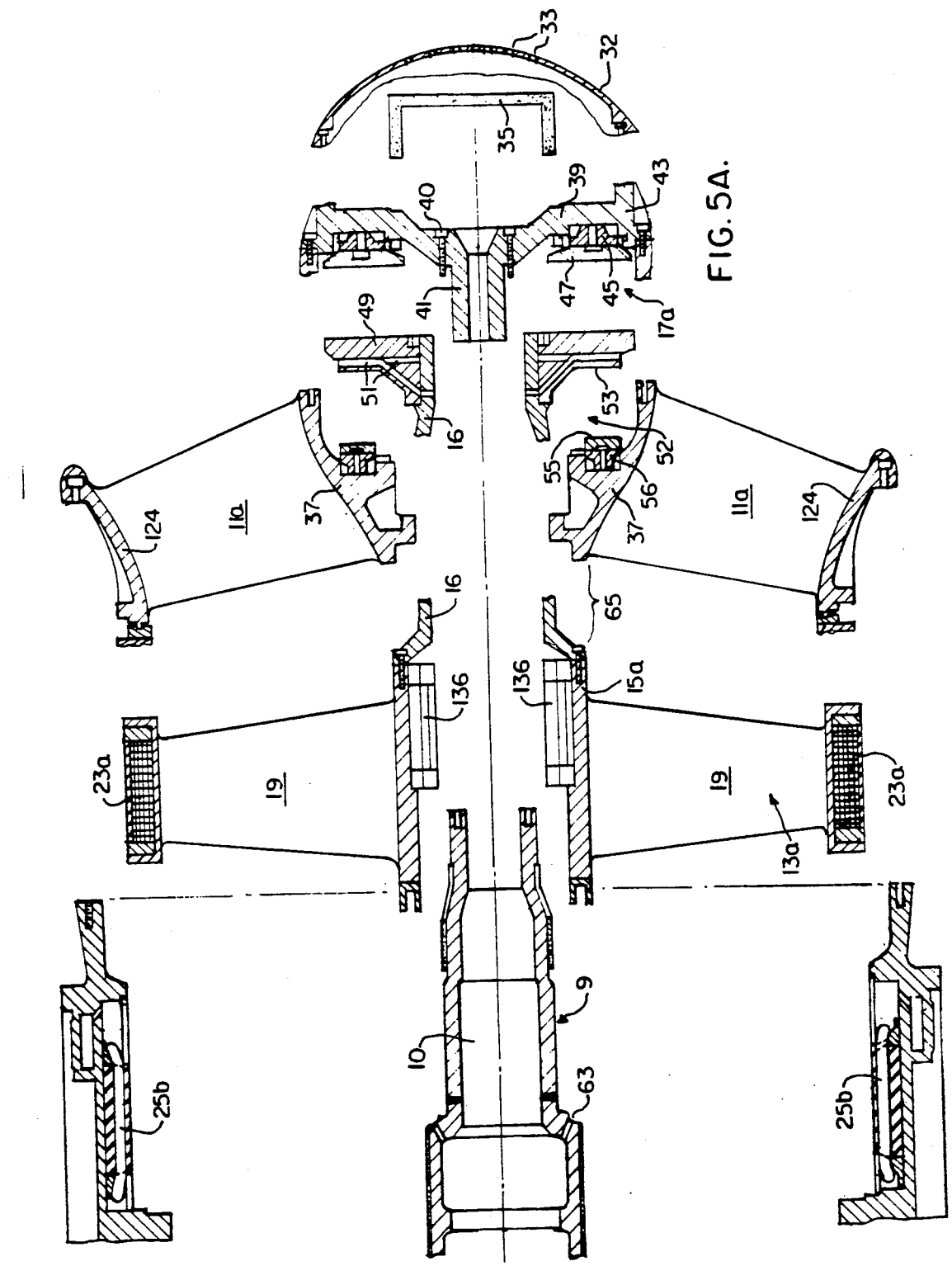
FIG. 5A is an exploded cross-sectional side view of the propulsor unit shown in FIG. 1 illustrating the various components of the bearing assembly disposed between the shaft of the unit, and the hub of the propeller.

To reduce radial friction between the hub 15a of the propeller 13a and the shaft assembly 9, a pair of radial sleeve bearings 57 and 59 are provided in the positions shown in both FIGS. 2 and 5A. While not specifically shown in the several figures, each of these radial bearings generally includes a tubular bushing preferably formed from Monel ® which further contains a pair of rubber bearing sleeves. Each of the sleeves may include a plurality of spiral grooves (again not shown) which helps them to expel any foreign matter entrained within the ambient water which constantly flows through both the radial sleeve bearings 57 and 59, and the primary and secondary thrust bearings 38 and 52.

With final reference to FIGS. 2 and 5A, and a description of how ambient water flows through the various bearing surfaces contained within both the bearing assemblies 17a,b, it should be noted that the shaft assembly includes a pair of opposing water inlets 63a,b in its midsection, each of which communicates with the through-bore 10. These water inlets 63a,b allow water to be drawn in the space between the hubs 15a,b of the propellers 13a,b when the electric motors 24a,b rotate the blades 19 of these propellers. The water travels through these spaces and from thence through the impeller bores 51 located in the runner 49. From there, the water travels between both bearing faces of the runner 49, and the primary bearing ring 47 and secondary bearing ring 55. Ultimately, water is expelled out of a radial outlet 65 defined between the edges of the hubs 15a,b of the propellers 13a,b,and the strut mounting members 37 of the housings 30 of each of the bearing assemblies 17a,b.

The fact that the thrust bearings and radial bearings contained within the bearing housings 30 of the bearing assemblies 17a,b are each separately and easily accessible through the separate removable covers 32 included in each of the bearing assemblies allows maintenance operations such as repair or replacement of parts to be performed without the need for disassembling all of the bearings within the propulsor unit 1, and without the need for removing the entire propulsor unit 1 from the ship upon which it is mounted or even for the ship to be dry-docked. This is a significant advantage, as the various components within the bearing assemblies 17a,b, no matter how well designed, are one of the most likely candidates for repair and replacement during the lifetime of the propulsor unit 1.

Figure 7:
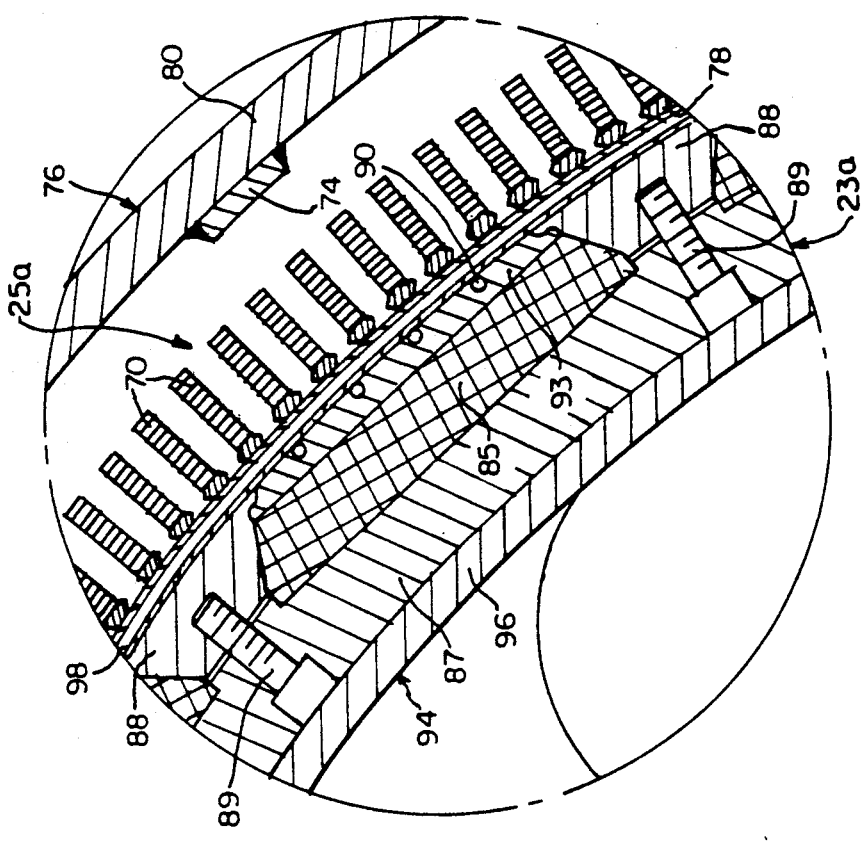
FIG. 7 is an enlargement of the circled area labeled 7 in FIG. 6, illustrating the details of the structure of both the stator and the rotor.
Figure 6:
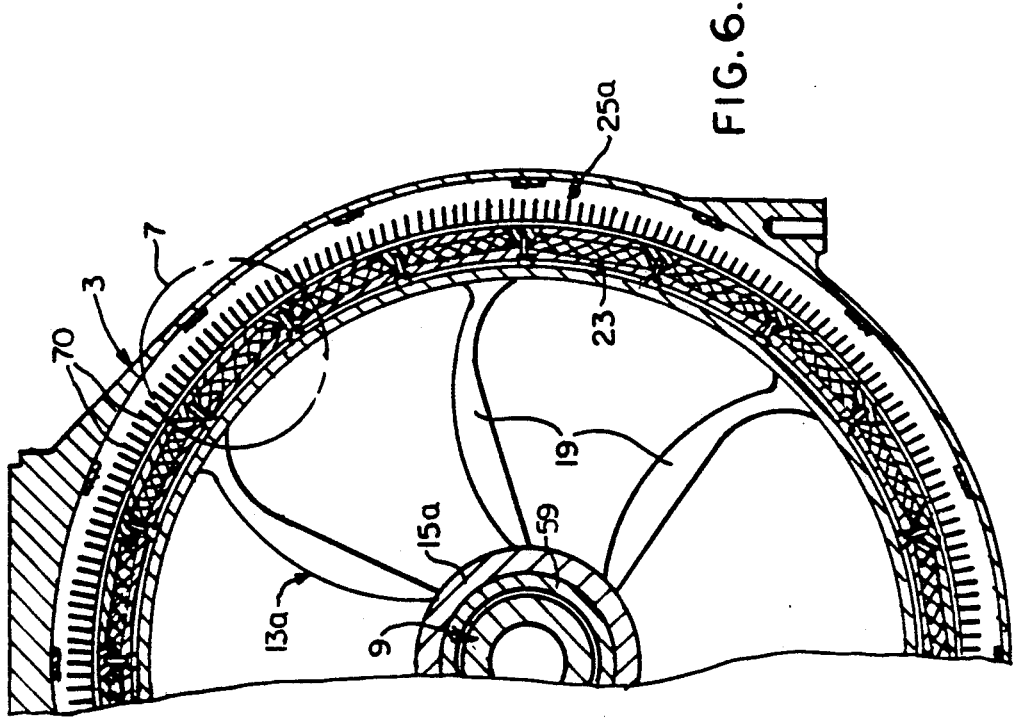
FIG. 6 is a front, cross-sectional view of the propulsor unit illustrated in FIG. 1 along the lines 6—6.

FIGS. 6 and 7 illustrate the details of the electric motors 24a,b used to power the propellers 13a,b of the unit 1. As has been indicated earlier, the electric motors 24a,b are alternating current motors that generally consist of a rotor 23a,b mounted around the periphery of the blades 19 of the propellers 13a,b which are in turn closely surrounded by stators 25a,b which are "canned" within the shroud assembly 3. The ac motors 24a,b may be either synchronous motors that use brushless exciters 136 located between the shaft assembly 9 and propeller hubs 15a,b, or permanent magnet type motors. Synchronous motors would be preferred in instances where the unit was expected to generate the large amounts of thrust necessary to drive a submarine or other relatively large vehicle, as it would be difficult to assemble the large permanent magnets necessary for a propulsor unit of such size. In such an embodiment, the inner annular portion of the brushless exciters 136 remains stationary while the outer annular portion rotates along with the hubs 15a,b of the propellers 13a,b. The electrical current generated by the exciters 136 is conducted to electromagnet coils (not shown) in the rotors 23a,b by way of cables (not shown) while alternating current is conducted through the stators 25a,b. The motors 24a,b then operate in known, synchronous motor fashion, where the rotational speed of the propellers 13a,b is controlled by the frequency of the alternating current conducted through the stators 25a,b.

For smaller capacity units where the necessary permanent magnets for the rotors 23a,b pose no manufacturing difficulties, a permanent-magnet type ac motor is preferred for two reasons. First, a permanent-magnet motor provides about ten percent better efficiency over a synchronous-type motor. Secondly, this higher efficiency can be realized with a somewhat larger spacial gap between the outer periphery of the rotors 23a,b, and the inner peripheries of the stators 25a,b. In an operational primary propulsor unit 1 of moderate size, this larger gap may be as wide as 0.50 inches (or 1.31 centimeters), in contrast to a standard gap of 0.25 inches or less. The use of a larger (as opposed to a smaller) gap advantageously reduces both the drag losses between the rotors 23a,b and the stators 25a,b which are caused by the presence of a thin film of sea water between these two components, and also reduces the amount of noise generated at this particular location of the propulsor unit 1. Other advantages include the generation of smaller amounts of harmonic currents (caused by unwanted dissymmetries in the magnetic field generated by the stator windings), and consequent lower (as opposed to higher) vibrations caused by the interaction of such currents on the rotors 23a,b. Vibrations caused by any off-center "wobble" of the rotors 23a,b as they rotate within their respective stators 25a,b are also reduced. Finally, the larger gap afforded by the use of permanent magnets in the motors 24a,b make it less likely that the rotation of the rotors 23a,b within the stators 25a,b could be impeded or stopped by the introduction of foreign matter in this gap, and further renders the entire unit 1 more resistant to external shocks, as the unit would be more tolerant to any shock-induced damage which tended to knock the rotors 23a,b off center with respect to their stators 25a,b. All these are significant advantages, particularly in the context of submarine applications.

As may best be seen with respect to FIG. 7, the stators 25a,b of each of the motors 24a,b includes a plurality of uniformly spaced stator core windings 70. Each of these stator core windings 70 is ultimately connected to lead wires (not shown) which are ultimately connected to a terminal post assembly (not shown). Moreover, each of the stator core windings 70 is received in a radial slot present in a stator core 72 (not shown in FIGS. 6 or 7, but shown in FIGS. 2 and 5A) formed from a stack of laminated magnetic steel rings that conduct the magnetic fields generated by the windings 70, but which resist the conduction of unwanted eddy currents. A plurality of building bars 74 are welded along the sides of the stator core 72 for rigidifying the core 72. All of the components of the stators 25a,b are contained within a water-tight stator housing 76 formed from an inner wall 78, and an outer wall 80.

The rotors 23a,b of each of the electric motors 24a,b are formed from a plurality of trapezoidally-shaped magnets 85 mounted within a magnet housing ring 87 formed from carbon steel. Each of the magnets 85 is preferably formed from an alloy of NbBFe because of the excellent magnetic field capacity and B-H curve characteristics of this material. Each of the magnets 85 is maintained within the magnet housing ring 87 by zirconium copper rotor wedges 88 secured to the ring 87 by means of bolts 89. In the preferred embodiment, about 20 such trapezoidally-shaped magnets 85 are incorporated within the rotor 23. Four damper bars 90 formed from solid copper rods are provided over the upper ends of each of the magnets 85. These damper bars 90 are disposed within recesses present in pole cap members 93 which are secured over the top ends of each of the magnets 85. The purpose of the damper bars 90 and the rotor wedges 89 is to protect the magnets 85 from any electrical currents harmonically induced into the top surface of the rotors 23a,b as a result of unwanted dissymmetries in the magnetic field created by the stator coil windings 70. More specifically, any such harmonic currents will be concentrated within the highly conductive damper bars 90 and rotor wedges 88, which in turn will harmlessly dissipate them. If the damper bars 90 and rotor wedges 88 were not present in the rotor 23, such harmonically-induced currents would flow directly through the bodies of the magnets 85, and ultimately partially de-magnetize them. Additionally, the combination of damper bars 90 and rotor wedges 88 forms a sort of squirrel-cage structure that facilitates the starting of the rotors 23a,b.

Figure 5B:
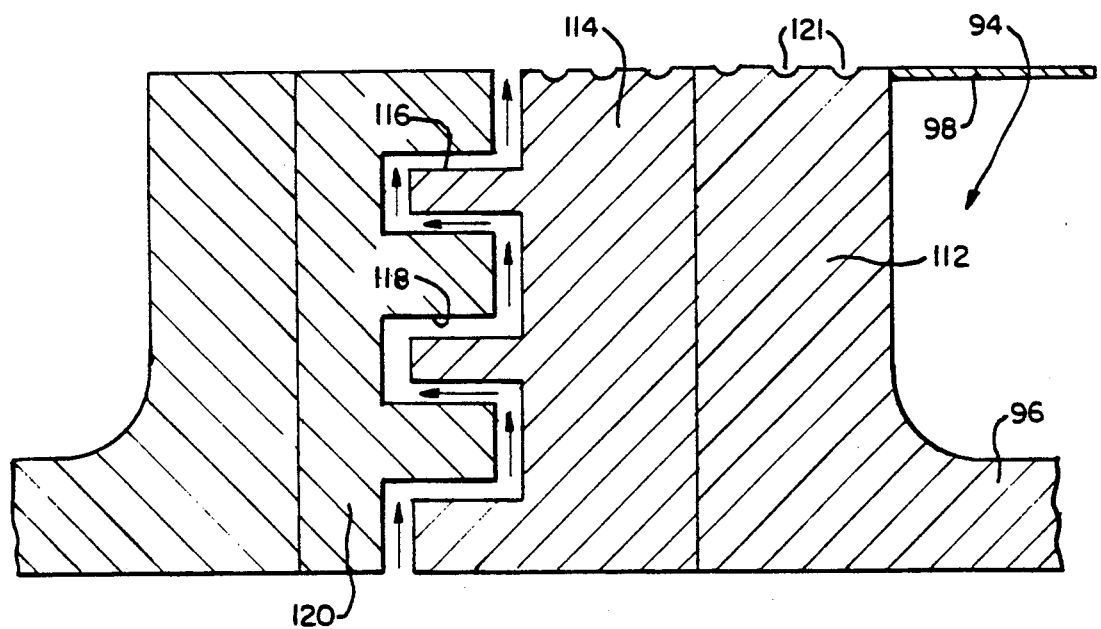
FIG. 5B is an enlargement of the circled area labeled 5B in FIG. 5A, illustrating how the crenulated surfaces of the rotor inlet ring and the stator inlet ring define a tortuous path between the stator and the rotor which helps to keep foreign particles from entering this space.

With respect now to FIGS. 5A, 5B and 7, the rotors 23a,b, like the stators 25a,b, are "canned" within a water-tight housing 94. The rotor housing 94 includes an inner wall 96, and outer wall 98, a front wall 100, and a rear wall 102 (all of which may be seen in FIG. 5A). With specific reference now to FIG. 5B, a rotor inlet ring 114 in connected to the rear wall 112 of the rotor housing 94, and includes a crenulated rear wall 116 which is complementary in shape to a crenulated front wall 118 of a stator inlet ring 120 disposed in opposition to the rotor inlet ring 114. The complementary crenulations of the rear wall 116 and front wall 118 of the rotor and stator inlet rings 114,120 define a tortuous path for the ambient sea water which helps to prevent foreign particles entrained therein from entering the gap between the outer peripheries of the rotors 23a,b and the inner peripheries of the stators 25a,b . Additionally, the outer periphery of the rotors 23a,b each includes a plurality of spiral grooves 121 which help to circulate and flush any such foreign matter out of the gap between the rotors 23a,b and respective stators 25a,b. The flow path created by the spiral grooves 121 is illustrated by the flow arrows present in the upper portion of FIG. 2.

Turning now to the details of the shroud assembly 3 and FIGS. 2 ar' 5A, this assembly 3 includes a funnel-shaped fairing 124 that is secured by mounting bolts 126 onto the upstream side of the stator housing 76. A vane mounting ring 128 is secured onto the upstream side of the stator housing 76 by way of mounting bolts as shown. At the rear of the shroud assembly 3, an outlet nozzle 130 is provided. This outlet nozzle 130 is in turn connected to a rear vane mounting ring 132. Vane mounting ring 132 is secured to the downstream side of the stator housing 76 of the downstream electric motor 24b by means of mounting bolts 134. It should be noted that the fluted Kort nozzle profile defined by the inlet fairing 124, and the outlet nozzle 130 in combination with the turbulence-minimizing shapes associated with the bearing housings 30 of the upstream and downstream bearing assemblies 17a,b all serve to advantageously maximize the thrusts of the two propellers 13a,b rotatably mounted within the interior of the shroud assembly.

In the preferred mode of operating the unit 1, the two electric motors 24a,b serve to rotate their respective propellers 13a,b at different (as opposed to uniform) speeds so that the upstream propeller 13a generates a high pressure flow of water that supercharges the downstream propeller 13b. Additionally, the pitch of the two propellers 13a,b is preferably different so that the electric motors 24a,b associated with each serve to rotate their respective propellers in different directions. Such counterrotation advantageously eliminates or at least minimizes any torque associated with the propulsor unit 1. This is a significant advantage, as the presence of such torque can significantly interfere with the steering of the craft to which the propulsor unit 1 is attached to, particularly when the propulsor unit 1 is used to drive the vessel at low speeds.

I claim:

1. A submersible propulsor unit, comprising:
a shroud having a water inlet and a water outlet;
a shaft assembly disposed along the axis of rotation of said shroud between said water inlet and outlet;
first and second propellers, each of which includes a separate hub rotatably mounted on said shaft assembly, wherein said second propeller is located downstream of said first propeller;
first and second electric motors for separately rotating said first and second propellers, wherein each motor includes a rotor mounted around the outer periphery of one of said propellers, and a stator mounted on said shroud around said rotor, and
first and second bearing assemblies, each of which includes a thrust bearing disposed between the hubs of said first and second propellers and said shaft assembly, wherein the thrust bearings associated with said first and second bearing assemblies are located on opposite ends of the shaft assembly.

2. A submersible propulsor unit as defined in claim 1, further comprising a plurality of vane members for supporting said shaft assembly within said shroud.

3. A submersible propulsor unit as defined in claim 2, wherein each of the thrust bearings associated with said first and second bearing assemblies includes a bearing housing that is affixed to one end of said shaft assembly, and wherein said vane members are mounted between both said bearing housings and said shroud to enhance the shock resistance of said unit.

4. A submersible propulsor unit as defined in claim 3, wherein at least a portion of each of the bearing housings is removable for affording separate access to the bearings associated with said first and second bearing assemblies.

5. A submersible propulsor unit as defined in claim 1, wherein each of the bearing assemblies includes means for circulating ambient water around its bearing surfaces for both lubricating and cooling said assembly.

6. A submersible propulsor unit as defined in claim 3, wherein each of the bearing housings remains stationary relative to the propellers during the operation of the unit to minimize the noise generated during operation.

7. A submersible propulsor unit as defined in claim 1, wherein said shaft assembly includes a through-hole along its axis of rotation for conducting a cooling flow of ambient water.

8. A submersible propulsor unit as defined in claim 1, wherein the pitch of the first propeller is the opposite of the pitch of the second propeller so that said propellers can produce torque-free thrust when counter-rotated.

9. A submersible propulsor unit as defined in claim 1, wherein each of said bearing assemblies further includes a radial bearing.

10. A submersible propulsor unit as defined in claim 7, wherein said shaft assembly further includes a filtration means on either end of said through-hole for preventing debris entrained in said ambient water from flowing through said through-hole.

11. A submersible propulsor unit, comprising:
a cylindrical shroud having a water inlet and a water outlet;
a shaft assembly disposed along the axis of rotation of said shroud between said water inlet and outlet;
a plurality of vane members for mounting said shaft assembly within said shroud;
first and second propellers, each of which includes a separate hub rotatably mounted on said shaft assembly, wherein said second propeller is located downstream of said first propeller, and
first and second electric motors for separately rotating said first and second propellers, each motor including a rotor mounted around the outer periphery of said propellers, and a stator mounted on said shroud around said rotor, and
first and second bearing assemblies each of which includes a thrust bearing disposed between the hubs of said first and second propellers and said shaft assembly, wherein the thrust bearings associated with said first and second bearing assemblies are located on opposite ends of the shaft assembly.

12. A submersible propulsor unit as defined in claim 11, wherein said vane members mount both the upstream and the downstream end of said shaft assembly within said shroud for increased shock resistance.

13. A submersible propulsor unit as defined in claim 11, wherein at least a portion of each of the bearing housings is removable for affording separate access to the bearings associated with said first and second bearing assemblies.

14. A submersible propulsor unit as defined in claim 13, wherein each of the bearing housings remains stationary relative to the propellers during the operation of the unit to minimize the noise generated during operation.

15. A submersible propulsor unit as defined in claim 11, wherein each of the bearing assemblies includes means for circulating ambient water around its bearing surfaces for both lubricating and cooling said assembly.

16. A submersible propulsor unit as defined in claim 15, wherein said shaft assembly includes a through-hole along its axis of rotation for conducting a flow of ambient water to said means for circulating ambient water around said bearing surfaces.

17. A submersible propulsor unit as defined in claim 16, wherein said shaft assembly further includes a filtration means on either end of said through-hole for preventing debris entrained in said ambient water from flowing through said through-hole.

18. A submersible propulsor unit as defined in claim 11 wherein the pitch of the first propeller is the opposite of the pitch of the second propeller so that said propellers can produce torque-free thrust when counter-rotated.

19. A submersible propulsor unit as defined in claim 11, wherein the combination of said first electric motor and said first propeller functions to generate a pressurized flow of water through the shroud that supercharges the combination of said second electric motor and said second propeller.

20. A submersible propulsor unit as defined in claim 4, wherein each of said bearing assemblies further includes a radial bearing that is accessible upon removal of said removable portion of said bearing housing.

21. A submersible propulsor unit, comprising:
a cylindrical shroud having a water inlet and a water outlet;
a shaft assembly disposed along the axis of rotation of said shroud between said water inlet and outlet;
a plurality of vane members for mounting said shaft assembly within said shroud;
first and second propellers, each of which includes a separate hub rotatably mounted on said shaft assembly, wherein said second propeller is located downstream of said first propeller, and wherein said first propeller acts to supercharge the second propeller during the operation of said unit;
first and second electric motors for separately rotating said first and second propellers, each motor including a rotor mounted around the outer periphery of said propellers, and a stator mounted on said shroud around said rotor, and
first and second bearing assemblies, each of which includes a thrust bearing disposed between the hubs of said first and second propellers and said shaft assembly, wherein the thrust bearings associated with said first and second bearing assemblies are both located on opposite ends of the shaft assembly, and wherein each bearing assembly includes means for circulating ambient water around its bearing surfaces for both lubricating and cooling said surfaces.

22. A submersible propulsor unit as defined in claim 21, wherein each of the thrust bearings associated with said first and second bearing assemblies includes a bearing housing that is affixed to one end of said shaft assembly, and wherein said vane members are mounted between both said bearing housings and said shroud to enhance the shock resistance of said unit.

23. A submersible propulsor unit as defined in claim 21, wherein at least a portion of each of the bearing housings is removable for affording separate access to the bearings associated with said first and second bearing assemblies.

24. A submersible propulsor unit as defined in claim 21, wherein said shaft assembly includes a through-hole along its axis of rotation for conducting a flow of ambient water to said means for circulating ambient water around said bearing surfaces.

25. A submersible propulsor unit as defined in claim 21, wherein the pitch of the first propeller is the opposite of the pitch of the second propeller so that said propellers can produce torque-free thrust when counter-rotated.

26. A submersible propulsor unit, comprising:
a shroud having a water inlet and a water outlet;
a shaft assembly disposed along the axis of rotation of said shroud between said water inlet and outlet;
first and second propellers, each of which includes a separate hub rotatably mounted on said shaft assembly, wherein said second propellers is located downstream of said first propeller;
first and second electric motors for separately rotating said first and second propellers, wherein each motor includes a rotor mounted around the outer periphery of one of said propellers, and a stator mounted on said shroud around said rotor, and
first and second bearing assemblies, each of which includes a thrust bearing disposed between the hubs of said first and second propellers and said shaft assembly, wherein the thrust bearings associated with said first and second bearing assemblies are located on opposite ends of the shaft assembly, and wherein each of said bearing assemblies includes means for circulating ambient water around its bearing surfaces for both lubricating and cooling said assembly.

27. A submersible propulsor unit, comprising:
a shroud having a water inlet and a water outlet;
a shaft assembly disposed along the axis of rotation of said shroud between said water inlet and outlet;
first and second propellers, each of which includes a separate hub rotatably mounted on said shaft assembly, wherein said second propeller is located downstream of said first propeller;
first and second electric motors for separately rotating said first and second propellers, wherein each motor includes a rotor mounted around the outer periphery of one of said propellers, and a stator mounted on said shroud around said rotor, and
first and second bearing assemblies, each of which includes a radial bearing, a thrust bearing disposed between the hubs of said first and second propellers and said shaft assembly, and a housing surrounding said radial bearing and thrust bearing and having a removable portion for affording separate access to the bearings it contains,
wherein the thrust bearings and housings associated with said first and second bearing assemblies are located on opposite ends of the shaft assembly.

* * * * *